US010573249B2

(12) United States Patent
Chesnokov

(10) Patent No.: US 10,573,249 B2
(45) Date of Patent: Feb. 25, 2020

(54) DISPLAY CONTROL

(71) Applicant: Apical Ltd, Cambridge (GB)

(72) Inventor: Viacheslav Chesnokov, Loughborough (GB)

(73) Assignee: Apical Limited, Cambridge (GB)

( * ) Notice: Subject to any disclaimer, the term of this patent is extended or adjusted under 35 U.S.C. 154(b) by 0 days.

(21) Appl. No.: 15/834,979

(22) Filed: Dec. 7, 2017

(65) Prior Publication Data

US 2018/0174526 A1 Jun. 21, 2018

(30) Foreign Application Priority Data

Dec. 21, 2016 (GB) ................................ 1621901.6

(51) Int. Cl.
*G09G 3/34* (2006.01)
*G06K 9/46* (2006.01)
*G09G 3/36* (2006.01)

(52) U.S. Cl.
CPC ......... *G09G 3/3406* (2013.01); *G06K 9/4652* (2013.01); *G09G 3/3611* (2013.01); *G09G 2320/0646* (2013.01); *G09G 2320/0666* (2013.01); *G09G 2330/021* (2013.01)

(58) Field of Classification Search
CPC .. G09G 3/3406; G09G 3/3426; G09G 3/3611; G06K 9/4652
USPC .......... 345/10, 102, 634, 690, 691; 382/118, 382/154, 224, 254
See application file for complete search history.

(56) References Cited

U.S. PATENT DOCUMENTS 6,327,708 B1 * 12/2001 Monsees .................. H04N 5/58 345/10
8,823,623 B2 * 9/2014 Katagawa .............. G01K 13/00 345/96
2003/0099159 A1 * 5/2003 Herbstman .......... G04B 19/202 368/77
2005/0269960 A1 * 12/2005 Ono ..................... G09G 3/3291 315/169.3
2006/0017807 A1 * 1/2006 Lee ........................... B60R 1/00 348/36
2006/0228040 A1 * 10/2006 Simon ................ G06K 9/00234 382/254
2008/0297460 A1 * 12/2008 Peng .................... G09G 3/3426 345/102
2008/0317358 A1 * 12/2008 Bressan ............. G06K 9/00456 382/224

(Continued)

FOREIGN PATENT DOCUMENTS

KR 10-2010-0033737 A 3/2010
WO 2014025588 A1 1/2014

OTHER PUBLICATIONS combined Search and Examination Report dated Jun. 22, 2017 for Application No. GB1621901.6.

*Primary Examiner* — Prabodh M Dharia
(74) *Attorney, Agent, or Firm* — EIP US LLP

(57) ABSTRACT

A method of controlling display of image data representing an image on a display device. The method includes determining one or more features of the image data. The method includes, in dependence on the determining, adjusting a display luminance of the display device, and applying a spatially-variant tone mapping operation to the image data. A display system and a display controller for controlling display of image data representing an image on a display device.

20 Claims, 5 Drawing Sheets

(56) References Cited

U.S. PATENT DOCUMENTS

| | | | | |
|---|---|---|---|---|
| 2009/0009456 | A1* | 1/2009 | Ohshima | G09G 3/342 345/89 |
| 2009/0295705 | A1 | 12/2009 | Chen | |
| 2010/0066752 | A1* | 3/2010 | Watanuki | G09G 3/3426 345/589 |
| 2010/0207956 | A1* | 8/2010 | Keh | G09G 3/3406 345/589 |
| 2011/0109644 | A1* | 5/2011 | Geutskens | G06F 3/017 345/589 |
| 2011/0279487 | A1* | 11/2011 | Imamura | G09G 3/3611 345/690 |
| 2012/0154462 | A1* | 6/2012 | Hempson | G09G 3/342 345/691 |
| 2012/0229526 | A1* | 9/2012 | Holmes | G06F 3/14 345/690 |
| 2013/0147864 | A1* | 6/2013 | Kim | G09G 3/3607 345/691 |
| 2013/0293121 | A1 | 11/2013 | Viacheslav | |
| 2014/0168194 | A1* | 6/2014 | Kong | G09G 3/3233 345/212 |
| 2015/0243200 | A1 | 8/2015 | Pan | |
| 2015/0245007 | A1* | 8/2015 | Hyodo | H04N 13/128 382/154 |
| 2015/0287172 | A1* | 10/2015 | Choudhury | G06T 5/40 382/254 |
| 2015/0325019 | A1* | 11/2015 | Sukeno | G09G 5/00 345/634 |
| 2015/0348246 | A1* | 12/2015 | Lim | G06T 5/001 382/167 |
| 2016/0132999 | A1 | 5/2016 | Kwon | |
| 2017/0154412 | A1* | 6/2017 | Tatsumi | G06T 5/009 |
| 2018/0096467 | A1* | 4/2018 | Chesnokov | G06T 5/009 |
| 2018/0098098 | A1* | 4/2018 | Chesnokov | H04N 19/30 |
| 2018/0174526 | A1* | 6/2018 | Chesnokov | G09G 3/3426 |
| 2018/0176604 | A1* | 6/2018 | Chesnokov | H04N 19/82 |
| 2018/0241979 | A1* | 8/2018 | Kanda | H04N 5/4403 |
| 2019/0251929 | A1* | 8/2019 | Fossati | G01J 3/463 |

* cited by examiner

DISPLAY CONTROL

CROSS-REFERENCE TO RELATED APPLICATIONS

This application claims priority to GB Application No. 1621901.6, filed Dec. 21, 2016, under 35 U.S.C. § 119(a). The above-referenced patent application is incorporated by reference in its entirety.

FIELD OF THE DISCLOSURE

The present disclosure relates to a method of controlling display of image data representing an image on a display device, a display controller and a display system.

BACKGROUND

Known display devices have backlights arranged to illuminate pixels of the display device. The pixels operate as optical switches to obscure a varying proportion of light from the backlight in order to produce display effects ranging from a darkest display effect, which may be intended to correspond with a complete obstruction of light from the backlight, to a lightest display effect, which may correspond with a minimal obstruction of light from the backlight. Backlights come in various forms, including globally-adjusted backlights, in which the luminance of the backlight is adjusted equally across the entire display, one dimensional locally-adjusted backlights in which the luminance of the backlight may be adjusted differently along strip-like regions arranged side by side along one dimension of the display, and two dimensional locally-adjusted backlights in which the luminance of the backlight may be adjusted differently in square or rectangular regions arranged in a two dimensional array across the display.

Known display devices suffer from light leakage. This means that the pixels are unable to completely obscure light from the backlight even for the darkest display effect. In other words, light may leak from the backlight and be visible to an observer even in an off state of the display device. Dark display effects may therefore be lighter than desired or intended, leading to a corresponding reduction in contrast of the display device.

It is known to reduce light leakage of a display device by locally dimming the backlight for dark image regions. However, a locally dimmed backlight as described above is relatively complex and many devices do not have local dimming. Even if local dimming is available, the size and configuration of the dimmable regions is unlikely to correspond with the size and shape of the light and dark regions of an image.

It is desired to provide a method of controlling display of image data representing an image on a display device to provide an improved display quality.

SUMMARY

According to some embodiments, a method of controlling display of image data representing an image on a display device is provided. The method includes determining one or more features of the image data. The method includes, in dependence on the determining, adjusting a display luminance of the display device, and applying a spatially-variant tone mapping operation to the image data.

According to some other embodiments, a display controller for controlling display of image data representing an image on a display device is provided. The display controller includes a luminance adjustment unit. The display controller includes a tone mapping module. The luminance adjustment unit is arranged to adjust a display luminance of a display device in dependence on a determination of one or more features of the image data. The tone mapping module is arranged to apply a spatially-variant tone mapping operation to the image data in dependence on the determination.

According to some other embodiments, a display system is provided. The display system includes a display device. The display system includes a display controller for controlling display of image data representing an image on the display device. The display controller includes a luminance adjustment unit. The display controller includes a tone mapping module. The luminance adjustment unit is arranged to adjust a display luminance of a display device in dependence on a determination of one or more features of the image data. The tone mapping module is arranged to apply a spatially-variant tone mapping operation to the image data in dependence on the determination.

BRIEF DESCRIPTION OF THE DRAWINGS

Further features will become apparent from the following description, given by way of example only, which is made with reference to the accompanying drawings.

DETAILED DESCRIPTION

Details of the method according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of controlling display of image data representing an image on a display device. The method includes determining one or more features of the image data and, in dependence on the determining, adjusting a display luminance of the display device and applying a spatially-variant tone mapping operation to the image data.

The display luminance can for example be adjusted to reduce light leakage from pixels of the display device, for example to improve the contrast of the display device. The spatially-variant tone mapping operation (discussed in further detail below) may be used to compensate for the change in display luminance to enhance detail in the image such that the detail remains visible despite the change in display luminance. This can improve the display quality of the image displayed by the display device.

In examples, the display luminance may be adjusted and the spatially-variant tone mapping operation may be applied in dependence on the level of compression-noise in the image data to control or reduce the visibility of compression artifacts in the image (explained further below). For example, for an image suffering from extensive compression artifacts, a smaller amount of spatially-variant tone mapping may be applied to avoid undesirably enhancing these artifacts in the image, or the display luminance may be adjusted to a lesser extent so that these artifacts are less noticeable to a viewer.

Figure 1:
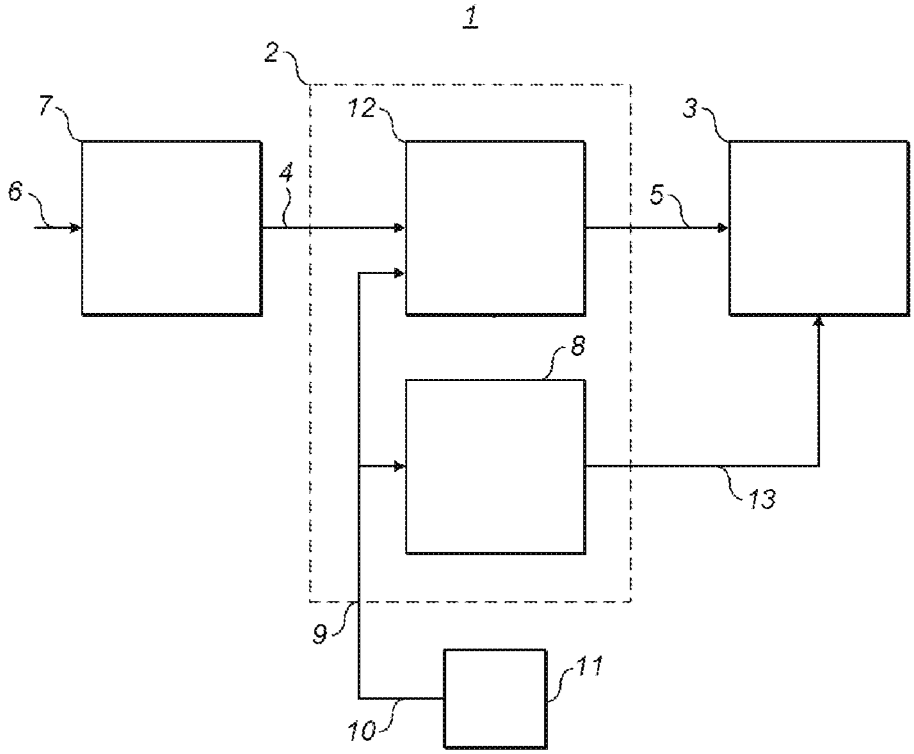
FIG. 1 is a schematic illustration of a display system according to examples.

FIG. 1 shows a display system 1 according to examples. The display system 1 includes a display controller 2 and a display device 3 for displaying an image. The image may include any graphical or visual content, for example text, graphics, pictures, and/or photographs. The image may be a still image or a moving image, e.g. a video image.

The display device may be a transmissive or transflective display device such as liquid crystal display (LCD) device, an electrowetting display device or an electrophoretic display device. Alternatively, the display device may be a display device in which pixels or picture elements of the display device generate light, such as an organic light emitting diode (OLED) display device or a plasma display device. The display device may be part of an electronic or computing device such as a television, laptop, tablet or smartphone.

The display device 3 in the example of FIG. 1 is an LCD device. In a typical LCD device, liquid crystal (LC) material is located, for example sandwiched, between support plates. The orientation of the molecules of the LC material can be controlled using an applied voltage to control the amount of light passing through the LC material and hence the display effect of pixels of the LCD device. Typically, the LC material can be switched between a dark or black display effect, in which very little or no light can pass through the LC material, and a light or white display effect, in which most or all light can pass through the LC material, for example from a backlight to the viewing side of the LCD device.

Figure 2:
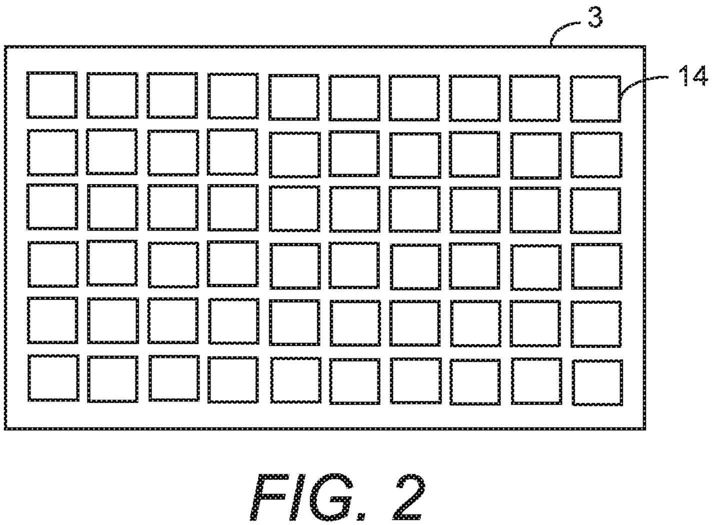
FIG. 2 is a schematic illustration of the display device of the display system of FIG. 1.

The display device 3 of FIG. 1 is illustrated schematically in FIG. 2 in plan view. As will be appreciated, various features of the display device 3 have been omitted for clarity. The display device 3 of FIGS. 1 and 2 includes a backlight.

Various different light sources may be used for the backlight. In the example of FIGS. 1 and 2, the backlight comprises an array of light emitting diodes (LEDs), one of which is labelled in FIG. 2 with the reference numeral 14. Other LEDs of the array are illustrated in FIG. 2 but are not labelled, for clarity. In FIG. 2, each LED 14 corresponds with a pixel of the display device 3. In other examples, one LED may correspond with multiple pixels or there may be more than one LED illuminating each pixel. In yet further examples, the backlight may include other light sources than LEDs, such as an electroluminescent panel or cold cathode fluorescent lamps. As for LEDs, in these further examples there may be one or more of these light sources per pixel or there may be one of these light sources for a plurality of pixels, such as one or more rows or columns of pixels.

The backlight may emit white light or light of other colors. In examples in which the backlight includes LEDs, such as the example of FIGS. 1 and 2, there may be red, green and blue LEDs to increase the color gamut of the display device.

The backlight in this example is arranged such that pixels of the display device 3 are located between the LEDs 14 and a viewing side of the display device 3. The LEDs may therefore be considered to be behind the pixels of the display device 3. However, in other examples, a backlight or light sources of the backlight may be arranged around an edge of the display device 3 panel, with a diffusion panel arranged to spread light substantially evenly behind the pixels, for example such that differences in illumination of pixels of the display device 3 are imperceptible to a viewer of the display device 3. For example, the backlight may include a plurality of light sources, such as LEDs, located along one or more edges of the display device 3 panel, such as along a top and a bottom edge. The display device 3 in such examples may further include one or more light guides or diffusers for distributing light from the light sources across the display device 3 panel to illuminate the pixels. The light sources may not be individually controlled or controllable, to simplify the driving of the display. Instead, the light sources may be controlled by one common controller, for example such that each light source is set at the same intensity. For example, where the display device 3 is a display device of a smartphone, the backlight typically includes strips of LEDs that are globally controlled.

Irrespective of the precise arrangement of the backlight, in examples the backlight is located for light from the backlight to pass through pixels of the display device 3, for example from a rear side of the display device 3 to a viewing side of the display device 3. In this way, the backlight illuminates the pixels and contributes to a display luminance of the display device 3. Display luminance is typically understood as referring to the luminous intensity per unit area of light travelling in a given direction, for example passing through a particular solid angle. Subjectively, the display luminance may be considered to correspond to brightness, which is the visual perception of the display luminance. For example, a higher display luminance will generally be experienced by a viewer as a brighter display. The display luminance of a display device in examples with a backlight typically depends on the intensity of the backlight and the transmittance of the pixels of the display device. Thus, the display luminance of such a display device can be controlled by controlling the intensity of the backlight or the proportion of light transmitted by the display device pixels, as described further below. In examples without a backlight, for example emissive display devices such as OLED or plasma display devices, the display luminance may be controlled by controlling the luminance or intensity of each of the pixels.

Image data 4 representing the image is input to the display controller 2 and output as display data 5 to the display device 3. An output of the display controller 2 may be connected to a display driver (not shown in FIG. 1), for example by a control line or electrode. The display driver may include driver stages for converting the display data 5 received from the display controller 2 to appropriate voltages for application to the display device 3. In such examples, one or more outputs of the display driver may be connected to the display device 3, for example by further control lines or electrodes, to drive the display device 3 to display the image corresponding to the display data 5, which in turn corresponds to the image data 4 received by the display controller 2. In other examples, the conversion of the data to a suitable voltage for application to the display device 3 may be carried out by the display controller 2 itself. In such cases, the display data 5 may be in the form of voltage signals.

Input data 6 may be converted to the image data 4 by a processor 7, the conversion including for example video or image decoding. In other examples, the input data 6 is input directly to the display controller 2 as the image data 4 without conversion or further processing. In these other examples, the processor 7 may be absent and the display controller 2 may convert or decode the image data 4 as needed.

The image data may include the intensity values of each pixel of the image, which may be stored with a greyscale or brightness level of, for example, from 0 to 255 per color band for 8-bit data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The image data may also include color data relating to the color of the image represented by the image data. For example, when the image is a color image, a pixel value of an intensity or brightness or each pixel may be stored separately for each color channel. If a pixel is represented by, for example, three primary colors such as in the RGB (red, green, blue) or YUV color spaces (where Y represents the luma of the color, U represents the difference between the blue component of the color and the luma and V represents the difference between the red component of the color and the luma), the visual appearance of each pixel may be represented by three intensity values, one for each primary color, for example with a bit precision of 8 bits per color channel. As will be appreciated by the skilled person, the image data may represent the image using any suitable representation, which may be different from the examples set out above, which are merely illustrative.

The image data 4 may be in any suitable format for representing images. In examples, the image data 4 is in a more than κ-bit format such as a higher than κ-bit floating point format. The image data 4 may, for example, be in an HDR (high dynamic range) format such as the JPEG XT format.

The display controller 2 includes a luminance adjustment unit 8 for controlling the luminance of the display device 3. In examples such as that of FIG. 1, the luminance adjustment unit 8 is arranged to adjust a display luminance of the display device in dependence on a determination of one or more features of the image data, which will be discussed further below. When the display device 3 includes a backlight or other light source, the luminance of the display device 3 can be controlled by the luminance adjustment unit 8 outputting a luminance control signal 13 for setting the intensity of the backlight or the other light source.

The luminance control signal 13 output by the luminance adjustment unit 8 may be selected from a look-up table, for example. The look-up table may include a mapping of features of the image data to a particular display luminance. For example, a particular feature may correspond with a particular luminance control signal 13 to be output by the luminance adjustment unit 8. The mapping in the look-up table may depend on a construction of pixels of the display device 3, for example a level of light leakage of pixels of the display device 3 as determined under reference conditions, such as in factory conditions. In further examples, the mapping or the luminance control signal 13 may also depend on a user input. For example, a user may be able to adjust the display luminance depending on their viewing preferences, which may depend on the viewing conditions such as whether the user is in a dark or light location or the nature of the content. For example, the optimal or desired display luminance for black text on a white background may be different from that for white text on a black background or for video content. The display luminance may be adjusted for example by a user selecting a particular display luminance for the display device 3, for example by interacting with a computing device coupled to the display device 3. In other examples, the luminance control signal 13 may be calculated by the luminance adjustment unit 8 based on the features of the image data. For example, where the features of the image data include or are representative of an amount of compression-noise in the image data, the luminance control signal 13 may be calculated based on the amount of compression-noise.

The display controller 2 of FIG. 1 also includes a tone mapping module 12 for applying a spatially-variant tone mapping operation to the image data 4. The tone mapping module 12 may be integrated with the luminance adjustment unit 8 or a separate module. One or both of the tone mapping module 12 and the luminance adjustment unit 8 may be integrated with the processor 7.

The spatially-variant tone mapping operation applied by the tone mapping module 12 may enhance detail or contrast in the image, while still ensuring the image appears relatively "natural" to an observer. To do this, the tone mapping is spatially-variant and therefore may be asymmetric in the brightness domain, such that a greater amount of tone mapping is applied to dark regions of the image than relatively bright regions, for example by altering an intensity value of relatively dark portions of the image to a greater extent than relatively bright portions. This mimics the behavior of the human eye, which has a relatively high dynamic range, and which is capable of seeing detail in even relatively dark regions of an image. The spatially-variant tone mapping operation may therefore be spatially non-uniform, with a greater amount of tone mapping applied to certain spatial regions of the image compared with other spatial regions. The tone mapping may be continuous and smoothly-varying in both spatial and luminance dimensions. The intensity range of pixels corresponding with detail to preserve in the image in dark and/or light areas may therefore be increased and the intensity range of other areas of the image may be decreased. The spatially-variant tone mapping may therefore be used to adjust or alter the dynamic range of the image, which in examples is the ratio between intensities of the brightest and darkest parts of the image. Various different tone mapping algorithms may be used for the spatially-variant tone mapping operation. For example, a suitable algorithm is the Orthogonal Retina-Morphic Image Transform (ORMIT) algorithm.

The luminance adjustment unit 8 and the tone mapping module 12 in examples such as FIG. 1 are arranged to, respectively, adjust the display luminance of the display device 3 and apply the spatially-variant tone mapping operation to the image data 4 in dependence on a determination of one or more features of the image data. In other words, both the display luminance and the strength of the spatially-variant tone mapping applied to the image data may depend on the one or more features of the image data.

The one or more features of the image data may be any features or characteristics of the image data that may affect the display quality upon a change in display luminance and/or spatially-variant tone mapping. For example, the one or more features may include a feature representative of a level of compression-noise in the image data representing the image. In this example, applying spatially-variant tone mapping to image data with a relatively high level of compression-noise, for example to attempt to compensate for a reduction in display luminance, may increase the appearance of unsightly compression artifacts in the image, reducing the display quality.

The compression-noise may be visible as pixels with an incorrect (for example noticeably darker or lighter) intensity, around features of the image such as edges or regions corresponding to a transition from a light to a dark image region. There may also or instead be visible "blocks" of pixels with the same intensity around such image features, rather than pixels with smoothly varying intensities. Compression-noise, sometimes referred to as compression artifacts, such as these are typically caused by the quantization step of a lossy encoding operation applied to input data to generate the image data, such as a JPEG (Joint Photographic Experts Group, ISO/IEC 10918) or JPEG XT (ISO/IEC 18477) encoding operation, for example by the processor 7. This step generally involves rounding of various components to integer values, thereby reducing the information associated with the quantized image data after encoding. The visibility of such compression artifacts may depend on the extent or amount of compression applied to the input data 6 to obtain the image data 4 received by the display controller 2.

In order to determine the feature representative of the level of compression-noise in the image data it may not be necessary to calculate an exact or precise level or amount of compression-noise in the image data. Instead, it may be sufficient to determine or estimate an approximate or rough amount of compression-noise that is expected to be present in the image data. For example, the one or more features of the image data may include a feature that the image data satisfies a predetermined compression-noise criterion. This feature may be derived from a calculation of the compression-noise in the image data or this feature may be ascertained based on another characteristic of the image data that indicates an approximate or expected level of compression-noise in the image data.

For example, a format of the image data may be indicative or representative of the approximate level of compression-noise in the image data. In such cases, the compression-noise criterion may relate to the format of the image data. For example, if the format of the image data is a low dynamic range (LDR, sometimes referred to as SDR or standard dynamic range) format such as the JPEG file format, this may be indicative that the image data has a relatively high level of compression-noise. In contrast, if the format of the image data is a high dynamic range (HDR) format such as the JPEG XT file format, this may indicate that the image data has a relatively low level of compression-noise.

In these examples, the feature representative of the level of compression-noise in the image data may relate to a format of the image data, such as a high dynamic range format. In such cases, the determining the feature representative of the level of compression-noise in the image data may involve, solely or in conjunction with other steps, determining the format of the image data and assessing whether the format is of at least one predetermined format considered to satisfy the predetermined compression-noise criterion. If the format is of the at least one predetermined format, the display luminance of the display device may be adjusted and the spatially-variant tone mapping operation may be applied to the image data. Where the feature relates to a high dynamic range format, the determining the feature representative of the level of compression-noise in the image data may thus involve determining that the image data is in an HDR format.

In other examples, the predetermined compression-noise criterion may correspond to another criterion such as a threshold level of compression-noise in the image data. In such cases, the determining the feature representative of the level of compression-noise in the image data may include processing the image data, for example to calculate the amount or level of the compression-noise in the image data. The calculated level of compression-noise can then be compared against the threshold level of compression-noise to ascertain whether the predetermined compression-noise criterion is satisfied.

To put the method according to examples such as FIGS. 1 and 2 into context, two examples will now be described with reference to FIGS. 3 and 4. The examples of FIGS. 3 and 4 may be implemented using the display system of FIG. 1 or other display systems. These examples are merely illustrative and are not to be taken as limiting.

Figure 3:
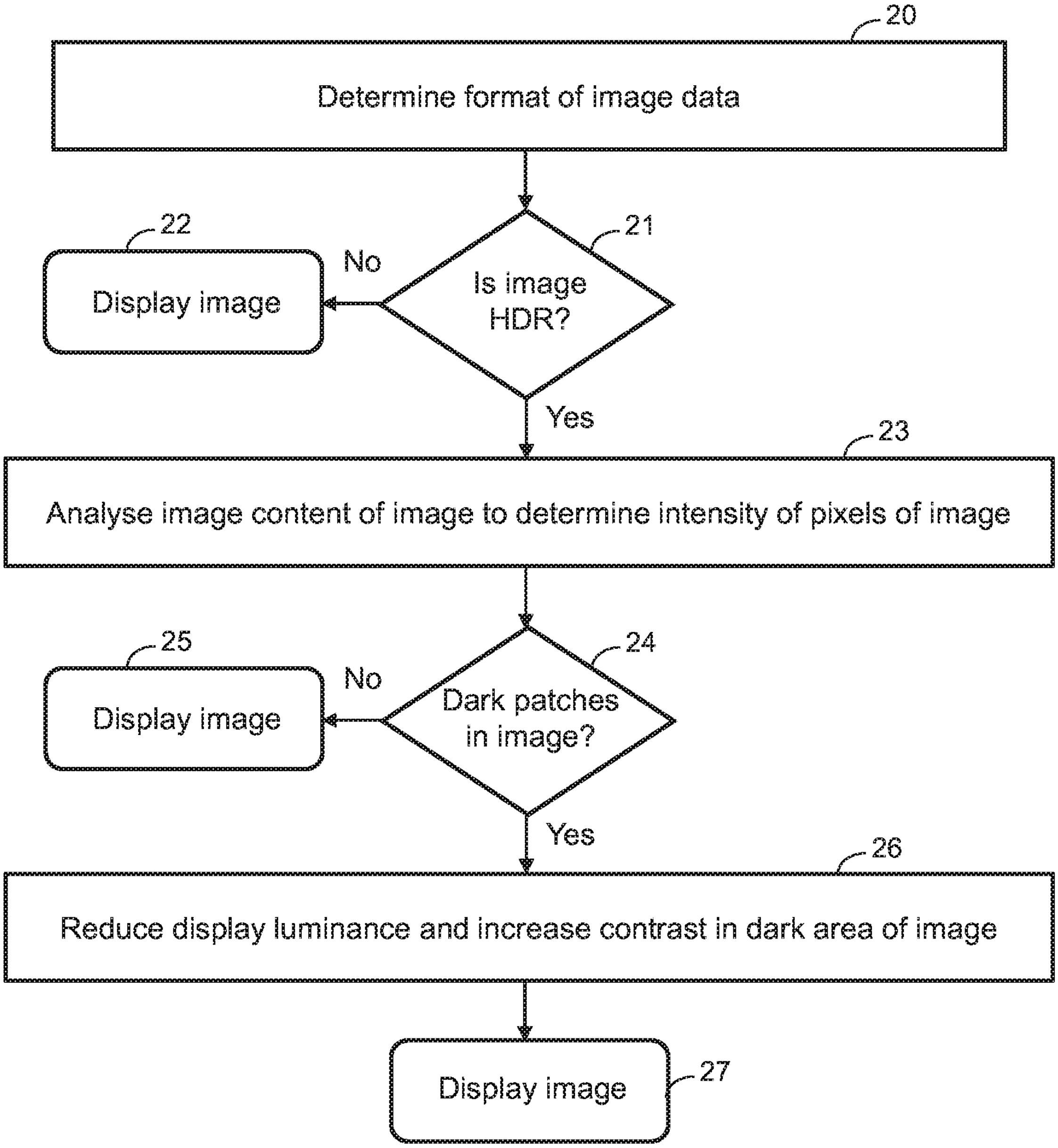
FIG. 3 is a flow diagram illustrating a method of controlling display of image data representing an image on a display device according to examples.

In the example of FIG. 3, the image format of the image data is determined 20. Thus, in this example, the one or more features of the image data include a feature representative of the level of compression-noise in the image data, which relates to a format of the image data. In this example, the format to which the feature relates is an HDR format. Hence, the determining the one or more features of the image data includes determining whether the image data is in an HDR format 21. In this example, if the image is not an HDR image, the image is displayed 22 on the display device. In other examples, however, image data representing a non-HDR, for example SDR or LDR, image may undergo further processing before the image is displayed, the display luminance of the display device may be adjusted and/or a spatially-variant tone mapping operation may be applied to the image data.

In the example of FIG. 3, if the image is an HDR image, the image content of the image is analyzed to determine the intensity of pixels of the image 23. For example, the display controller 2 may include a content analyzer to assess the extent of display luminance adjustment and/or spatially-variant tone mapping to apply based on an analysis of the image content of the image. In the method of FIG. 3, the analysis of the image content includes determining whether the image includes dark patches 24, for example a certain number of adjacent pixels with a pixel intensity below a predetermined pixel intensity threshold. Dark image patches may be particularly susceptible to light leakage. Thus, where it is determined that the image includes dark patches, the display luminance of the display device may be reduced to a greater extent than for other images that do not include dark patches. In such cases, the strength of the spatially-variant tone mapping may be correspondingly larger.

If it is determined that the image does not include dark patches, the image is displayed 25 on the display device 3. In FIG. 3, the image is displayed on the display device 3 without adjustment of the display luminance or application of a spatially-variant tone mapping operation. However, in other examples, the display luminance may be adjusted and/or a spatially-variant tone mapping operation may be applied to the image data even in cases where it is determined that the image does not include dark patches. For example, the display luminance may be reduced to reduce power consumption and spatially-variant tone mapping may be applied to the image data to compensate for the reduction in display luminance so as to maintain a display quality of the image. Alternatively, if the image is a relatively bright image, the display luminance may be reduced to reduce power consumption without applying spatially-variant tone mapping. This may be done for example if the image is bright enough that a reduction in the display luminance would not noticeably reduce the display quality of the image as perceived by a viewer.

If the image is determined to be an HDR image and to include dark patches, the display luminance is reduced and the spatially-variant tone mapping operation is applied to the image data to increase contrast in a dark area of the image 23. The image is then displayed 24 on the display device.

By reducing the display luminance, light leakage from a light source supplying light to pixels of the display device may be reduced. This may improve the image quality for a viewer by making dark areas of the image appear darker, for example so that these dark areas are closer to a desired dark state, and by increasing the contrast of the display device. Reducing display luminance in this way may also reduce power consumption of the display device.

However, by reducing the display luminance, detail in dark areas of the image may no longer be visible to an observer. To maintain a display quality of the image, the spatially-variant tone mapping operation can be applied to increase contrast in these dark areas, to enhance, intensify or increase the visibility of detail in these image regions without compression-noise becoming visible in the image.

If, however, the image suffers from a higher level of compression-noise, increasing the contrast in dark areas of the image to compensate for a reduction in display luminance would not only increase the visibility of detail in these regions but would also increase the visibility of compression artifacts in these regions. This may be unsightly. Thus, in examples such as FIG. 3, the display luminance reduction and spatially-variant tone mapping is only applied where the one or more features of the image data indicate that the level of the compression-noise in the image data is relatively low, for example below a predetermined compression-noise threshold (which in the example of FIG. 3 is satisfied if the image is an HDR image). Where the level of the compression-noise is above this predetermined compression-noise threshold, for example if the image is an SDR image, the display luminance is not reduced and the spatially-variant tone mapping is not applied, to avoid the compression-noise artifacts becoming visible.

In further examples, the adjustment in the display luminance and the amount of spatially-variant tone mapping applied to the image data may vary, for example smoothly, in dependence on the level of compression-noise in the image data or in dependence on a feature resulting from an analysis of image content of the image such as a darkness or pixel intensity of the darkest patch or patches of the image. For example, a decrease in display luminance may correspond with an increase in spatially-variant tone mapping and vice versa.

The amount of spatially-variant tone mapping applied to the image data depends on a tone mapping strength in examples. The tone mapping strength may be or correspond with a particular, e.g. a pre-determined, gain G. The gain G may be expressed as:

$$G = \frac{D_{TM}}{D} \tag{1}$$

where D is the dynamic range of the image data before the spatially-variant tone mapping operation and $D_{TM}$ is an output dynamic range to be obtained after the spatially-variant tone mapping operation. The output dynamic range may for example correspond with a suitable dynamic range for detail to be visible in dark regions of the image. The gain G may be calculated from the adjustment in the display luminance. For example, if the display luminance is reduced by a factor x, the gain G may be set to equal this factor x so that the output dynamic range is increased by the factor x to compensate for the reduction in the display luminance. As the tone mapping operation is spatially-variant, the gain G may vary in different image regions. For example, the gain G may be set to equal this factor x in dark image regions, but may be set to 1 (for example, so that there is no change in the dynamic range) for bright image regions. In other examples, the relationship between the display luminance and the gain G may be different, for example with the gain G equal to a function of the factor x for a reduction in display luminance by the factor x.

An input value α to the spatially-variant tone mapping operation may be derived from the gain G as follows:

$$\alpha = \frac{G - 1}{G_{max} - 1} \tag{2}$$

where G is the gain defined in (1), and $G_{max}$ is the maximum gain achievable with a maximum tone mapping strength.

The input value α may be considered to represent a strength of the tone mapping transformation, which may take a value between 0 and 1, for example, for example an amount or magnitude by which each pixel's intensity or brightness is altered by the tone mapping operation. The input value may be different for different pixels in the image, for example due to a different gain G for different pixels, in order to achieve an amount of tone mapping which varies across the image, i.e. spatially-variant tone mapping. For example, the input value may vary in accordance with pixel intensity so that the tone mapping is stronger (for example with a higher input value) in darker parts of the image with low pixel intensity values, and is weaker in brighter parts of the image, as described above. This allows stronger enhancement of the shadows without affecting the bright regions. For example, a pixel-by-pixel gain may be calculated, for example by dividing the pixel intensity with maximum, or at least relatively strong, tone mapping applied by the pixel intensity with zero, or at least relatively low, tone mapping for each pixel, for example to apply a maximum or relatively strong tone mapping to each pixel. The pixel-by-pixel gain may be used as the input value to the spatially-variant tone mapping operation and may be applied to the image data by multiplying the pixel intensity value of each pixel with the corresponding gain value for that pixel. As noted above, the tone mapping operation may be the ORMIT algorithm. In this case, the input value is the ORMIT α parameter.

In further examples, the spatially-variant tone mapping operation may be or include a so-called alpha-blending operation. In these examples, the input value α to the spatially-variant tone mapping operation may be the input to the alpha-blending operation, which governs a relative contribution to the image data used for displaying the image on the display device of first image data representing the image with a first amount of spatially-variant tone mapping applied and second image data representing the image with a second amount of spatially-variant tone mapping applied. The input to the alpha-blending operation may be calculated from the gain G in the same or a similar manner as the gain G is calculated for the example of the ORMIT algorithm.

In this case, the pixel intensity values may be modified as:

$$I_{out}=I_1\times(1-\alpha)\times I_2\times\alpha \quad (3)$$

where $I_{out}$ is the output intensity value for the image data, $I_1$ is the pixel intensity value from the first image data and $I_2$ is the pixel intensity value from the second image data, which may be obtained by applying an initial amount of spatially-variant tone mapping to the first image data.

Other blending schemes are also possible. For example, the pixel intensity values may instead be modified as:

$$I_{out}=\sqrt{I_1^2\times(1-\alpha)+I_2^2\times\alpha} \quad (4)$$

where $I_{out}$, $I_1$, $I_2$ and a are as previously defined.

The alpha-blending procedure may be considered to be an overlaying or combining of two versions of the same image; one with no tone mapping applied (corresponding to the first image data) and one with non-zero tone mapping applied (corresponding to the second image data), which may be with maximal tone mapping applied, for example. In further examples, the first image data may also be tone mapped compared with the image data prior to application of the spatially-variant tone mapping operation, but with a different amount of tone mapping than the initial amount of spatially-variant tone mapping applied to generate the second image data.

Figure 4:
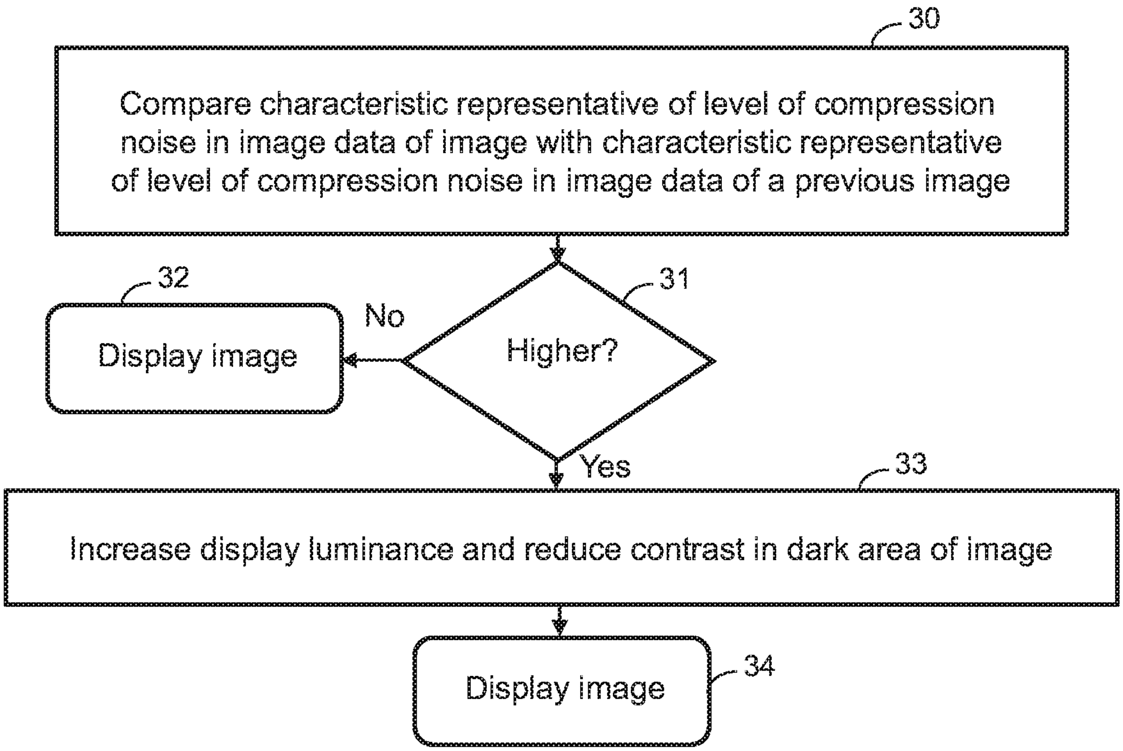
FIG. 4 is a flow diagram illustrating a method of controlling display of image data representing an image on a display device according to further examples.

FIG. 4 relates to a further example in which a characteristic representative of the level of compression-noise in image data of an image is compared with a characteristic of the level of compression-noise in image data of a previously displayed image 30 to assess whether the characteristic of the image data of the image is higher than that of the previously displayed image 31. For example, the method of FIG. 4 may include determining a feature that the characteristic of the image data of the image is higher than that of the previously displayed image. The characteristic representative of the level of compression-noise in the example of FIG. 4 is the level of compression-noise itself. However, in other examples, the characteristic may be a different characteristic, such as a characteristic that is merely indicative or representative of an approximate or expected level of compression-noise in the image data. For example, the characteristic may be a format of the image data, with certain formats, such as SDR formats, considered to represent relatively high compression-noise image data, and other formats, such as HDR formats, considered to represent relatively low compression-noise image data.

If the characteristic representative of the level of compression-noise in the image data of the image is lower than that of the image data of the previously displayed image, the image is displayed 32 on the display device. This may be the case for example where the characteristic representative of the level of compression-noise in the image data is compared against a predetermined compression-noise criterion. If the characteristic representative of the level of compression-noise in the image data of the image and the previously displayed image both satisfy the predetermined compression-noise criterion, for example if both the image and the previously displayed image are HDR images with relatively low compression-noise, then it may not be necessary to further alter the display luminance or the tone mapping.

In contrast, if the characteristic indicative of the level of compression-noise in the image data is above that of the previously displayed image, for example if the previously displayed image was in an HDR format and the image is in an SDR format, the method of FIG. 4 includes increasing the display luminance and applying the spatially-variant tone mapping operation to the image data to reduce contrast in a dark area of the image 33. The image is then displayed 34 on the display device. For example, where the display luminance has previously been reduced for an HDR image and the contrast has been increased in the dark area to compensate for the reduction in the display luminance, the method of FIG. 4 may be used to re-adjust both the display luminance and the contrast, e.g. to nominal levels, for example to be the same as or similar to the respective levels prior to adjustment for the HDR image.

Unlike the method of FIG. 3, the example of FIG. 4 does not include adjusting the display luminance and applying a spatially-variant tone mapping operation in dependence on determining a feature resulting from an analysis of image content of the image. However, in other examples similar to FIG. 4, methods may include both comparing a characteristic representative of a level of compression-noise in image data of an image with that of a previously displayed image as well as determining a feature resulting from an analysis of image content of the image.

In the examples of FIGS. 1 to 4, the display luminance may be adjusted by applying a substantially spatially uniform adjustment to the display luminance. For example, the display luminance may be globally adjusted, for example so that the luminance for each pixel is altered by substantially the same amount or proportion as each other pixel, for example within 1%, 2%, 5% or 10%.

In examples in which the display device includes a backlight, the intensity of the backlight may be substantially spatially uniformly adjusted. This may simplify the driving of the display device, for example as this obviates the need to individually adjust the light incident on each pixel. For example, the intensity of each light source of the backlight, for example each LED 14 in the example display device 3 of FIGS. 1 and 2, may be increased by the same amount or substantially the same amount. Aside from simplifying the driving of the backlight, globally adjusting the backlight in this way can allow backlights of a more straightforward construction to be used for the display device. For example, fewer light sources may be used if there is no requirement to adjust the intensity of light supplied to each pixel on a pixel-by-pixel basis.

In further examples, though, the display luminance may be adjusted by applying a spatially-variant adjustment to the display luminance. In these further examples, the display luminance for some pixels may be altered by a different amount or proportion than for other pixels. For example, by applying the spatially-variant adjustment, the display luminance may be altered from being spatially substantially uniform, or uniform within human perception, to being spatially non-uniform. Alternatively, where the display luminance prior to adjustment is already spatially non-uniform, the spatially-variant adjustment may further alter the relative intensity or brightness of different pixels of the display device.

In these further examples, the display device may include a backlight including a plurality of light sources, each at a different location. A spatially-variant adjustment to the display luminance in these cases may be performed by adjusting a first intensity of a first light source of the plurality of light sources so that the first intensity is different from a second intensity of a second light source of the plurality of light sources. For example, as described above, the backlight may include light sources that each illuminate a strip or stripe of the display device panel. There may be, for example, one LED per strip, with each LED at an edge of the panel, and with a light guide arranged to distribute the light from each LED along the strip of pixels. In this example, the spatially-variant adjustment may be applied by adjusting the intensity of one of the LEDs, for example so that it is brighter or darker than the other LEDs. This typically leads to a, respectively, brighter or darker strip of pixels of the display device panel, for example such that the display luminance of the display device is spatially non-uniform. In other examples, the spatially-variant adjustment may be performed by adjusting the first intensity of the first light source by a different amount, factor or proportion as a second intensity of a second light source. For example, the first intensity may be decreased by a factor of 2 and the second intensity may be decreased by a factor of 4. These examples may therefore allow the display luminance to be adjusted in one or two dimensions, depending on the precise structure of the backlight, which may be different from that described above. For example, as described above, there may be one or more light source per one or more pixel rather than merely light sources located at an edge of the display device panel.

By applying such a spatially-variant adjustment to the display luminance, the display quality may be further improved. For example, if a portion of the image is relatively bright, the display luminance may not be adjusted in pixels of the display device that are used for displaying the portion of the image. However, for pixels corresponding to a different portion of the image that is relatively bright, the display luminance may be reduced and a spatially-variant tone mapping operation may be applied to the image data representing the different portion of the image to compensate for the reduction in display luminance. Moreover, locally adjusting the display luminance in this way may further reduce the power consumption of the display device. For example, a local reduction in display luminance may result in a power saving of up to around 30% compared with a global reduction in display luminance.

In the examples of FIGS. 3 and 4, the display luminance of the display device is adjusted and the spatially-variant tone mapping operation is applied to the image data in dependence on the level of compression-noise in the image data (and also in dependence on the image content of the image in FIG. 3). However, in other examples, the display luminance and the spatially-variant tone mapping operation may alternatively or additionally depend on other features of the image data or other parameters or characteristics. FIG. 1 illustrates such an example.

Referring back to FIG. 1, the display controller 2 has an input 9 for an ambient light signal 10 representing an ambient light level relevant for viewing the image. The ambient light signal is connected to the luminance adjustment unit 8.

The ambient light signal 10 is output by an ambient light sensor 11 that measures the ambient light level near the display device 3. The ambient light sensor may include one or more photo-detectors for measuring the ambient light level; the use of multiple sensors may increase the reliability of the measurement of diffuse ambient light. The ambient light level may be determined at the viewing side and/or the rear side of the display device 3.

In the example of FIG. 1, the display luminance of the display device may be adjusted and the spatially-variant tone mapping operation may be applied to the image data in further dependence on the ambient light level, for example in dependence on the ambient light level as well as on the one or more features of the image data. For example, if the ambient light level is low, for example if the display device is being viewed in dark conditions, the display luminance may be reduced by a larger amount than if the display device was subject to a high ambient light level. This may compensate for the increased visibility of light leakage in low light conditions compared with bright viewing conditions. In such cases, the strength of the spatially-variant tone mapping may be larger in dark conditions than in light conditions, as it may be necessary to further enhance image detail in dark conditions to offset the reduction in display luminance.

In other examples, the adjustment of the display luminance of the display device and the application of the spatially-variant tone mapping operation may depend on a level of reflection of ambient light or an expected level of reflection of ambient light from the display device (sometimes referred to as "screen glare"). This generally depends on the ambient light level and the display luminance, for example the intensity of the backlight in display devices with a backlight, as well as other factors such as the construction of the display device or the cleanliness of the display device screen. Screen glare is typically a problem in bright or sunny conditions and may be reduced by increasing the display luminance. However, increasing the display luminance typically also increases the amount of light leakage for dark image regions, making black image patches appear dark grey rather than black. Thus, there may be a trade-off between screen glare and light leakage. For example, in conditions in which screen glare dominates, the display luminance may be increased until such point that the amount of light leakage starts to become substantially equal to the level or expected level of reflection of ambient light from the display device. This may be determined for example by comparing the intensity of light leaking from pixels of the display device and the intensity of reflected light. At this point, the display luminance may not be increased further, to avoid the light leakage becoming even more visible. The spatially-variant tone mapping operation may be applied to the image data as described above, to counteract the change in display luminance.

Figure 5:
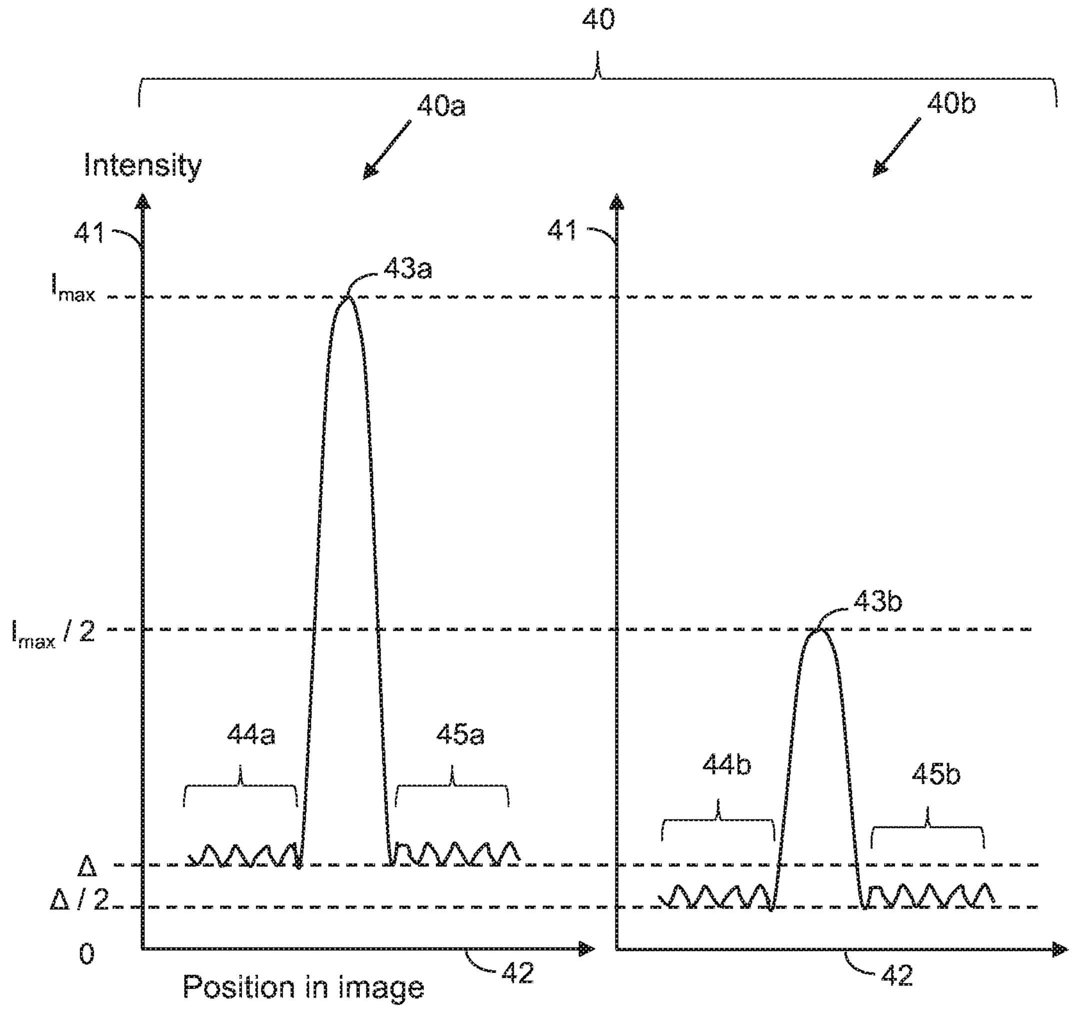
FIG. 5 is a graph illustrating schematically pixel intensities before and after application of the method according to examples.

FIG. 5 is a graph 40 illustrating schematically pixel intensities of an image before and after application of the method according to examples, such as the examples described above with reference to FIGS. 3 and 4. The graph 40 of FIG. 5 includes two sub-graphs labelled with the reference numerals 40*a* and 40*b* respectively. Each of the two sub-graphs 40*a*, 40*b* have the same axes: the y-axis 41 corresponds with the pixel intensity and the x-axis 42 corresponds with the position in the image for a row of pixels of the image. The pixel intensities are in a linear color space, with intensity proportional to the number of photons emitted per pixel. The pixel intensities may therefore be considered to correspond to a physical luminance. The first sub-graph 40*a* shows the pixel intensities for the image prior to application of the method, whereas the second sub-graph 40*b* shows the pixel intensities for the image after application of the method.

As can be seen from the first sub-graph 40*a*, initially the image includes a central light region 43*a*, with a maximum pixel intensity of $I_{max}$. The central light region 43*a* is surrounded by dark regions 44*a*, 45*a*, with a lower pixel intensity. In this example, the darkest or lowest intensity parts of the dark regions 44*a*, 45*a* are intended to correspond with a black or darkest display state of the display device. However, due to light leakage from pixels of the display device, the darkest parts of the dark regions 44*a*, 45*a* have a pixel intensity of $\Delta$ rather than 0, for example due to the extra photons escaping from the pixels in these regions. The parts of the dark regions 44*a*, 45*a* with an intensity higher than Δ represent detail in the dark regions 44*a*, 45*a*, which will be visible to the user due to the difference in intensity compared with the darkest parts of the dark regions 44*a*, 45*a*.

In the example of FIG. 5, the application of the method involves reducing the display luminance of the display device by a factor of two. This reduces the intensity of the central light region 43*b* in the image after the method (shown in the second sub-graph 40*b*) from $I_{max}$ to $I_{max}/2$. This reduction in intensity of the light region typically does not unduly affect the display quality as perceived by a viewer. Even though the light region will be for example light grey rather than white, this change in greyscale is generally not visible to the viewer.

Similarly, the intensity of the darkest parts of the dark regions 44*b*, 45*b* in the second sub-graph 40*b* are Δ/2 rather than Δ. However, a spatially-variant tone mapping operation has been applied to the image data representing the dark regions 44*b*, 45*b* in the second sub-graph 40*b*, which compensates for the reduction in the display luminance in the dark regions 44*b*, 45*b*. This can enhance the detail in these dark image regions, which would otherwise be lost. Despite this, the absolute difference between the lightest parts of the dark regions 44*b*, 45*b*, which as explained above may correspond with features or detail in the dark regions 44*b*, 45*b*, and the darkest parts of the dark regions 44*b*, 45*b* remains unchanged in the second sub-graph 40*b* compared with the first sub-graph 40*a*. This is because the tone mapping operation is applied in the RGB domain. Thus, even though the RGB intensity values are increased by a factor of 2 to compensate for the reduction in the display luminance by a factor of 2, the pixel luminance, which corresponds with the RGB intensity values multiplied by the display luminance remains unchanged. However, the contrast of the dark regions, for example taken as the difference between the brightest and darkest parts of the dark regions divided by the average intensity of the dark regions, is greater in the second sub-graph 40*b* than in the first sub-graph 40*a* due to the reduction in the average intensity in the dark regions. As the human visual system is more sensitive to changes in contrast than to changes in absolute luminance, this improvement in contrast will improve the image quality as perceived by a viewer for the second sub-graph 40*b* compared to the first sub-graph 40*a*. Thus, detail in the dark regions of the image displayed in accordance with the second sub-graph 40*b* will be more visible than for the first sub-graph 40*a*.

In a typical LCD device, the contrast will be around 1000. For such a display device, the display luminance may be reduced by a factor of between 2 and 4, and the gain obtained by the spatially-variant tone mapping may be increased by a corresponding factor of between 2 and 4, for example in dark parts of the image, although the precise display luminance adjustment and gain will generally depend on the one or more features of the image data.

Figure 6:
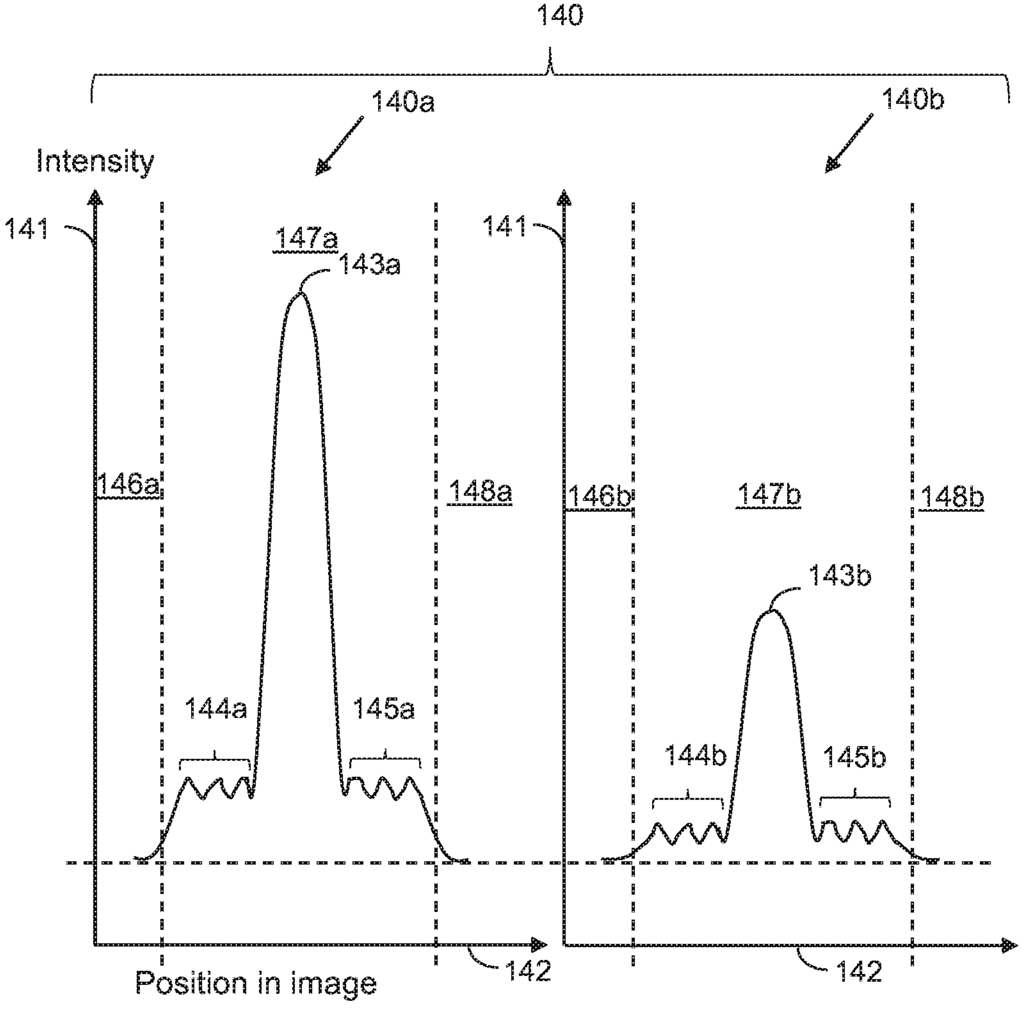
FIG. 6 is a graph illustrating schematically pixel intensities before and after application of the method according to further examples.

FIG. 6 is a graph 140 illustrating schematically pixel intensities of an image before and after application of the method according to further examples. Features of FIG. 6 similar to those of FIG. 5 are labelled with the same reference numerals incremented by 100; corresponding descriptions are to be taken to apply. The graph 140 of FIG. 6 is not necessarily drawn to scale; axis labellings have therefore been omitted, for clarity.

The display device used to display the image of FIG. 6 has a backlight including three light sources. In this example, the light sources are each arranged to illuminate a vertical strip of pixels so that there is a first, second and third zone 146*a*, 147*a*, 148*a* corresponding to a respective first, second and third light source. The first, second and third light sources illuminate, respectively, a first, second and third strip or plurality of columns of pixels. The second light source in the second zone 147*a* in the first sub-graph 140*a* has a higher intensity or luminance than the first and third light sources in the first and third zones 146*a*, 148*b*. This is to ensure the appropriate lightness or brightness of the central light region 143*a* of the image, which falls within the second zone 147*a*. However, due to the higher intensity of the second light source, the dark regions 144*a*, 145*a* surrounding the central light region 143*a* in the first sub-graph 140*a* are relatively light, for example due to light leakage from the pixels corresponding to the dark regions 144*a*, 145*a*. This may be visible to an observer of the image as a so-called "halo" artifact. As the skilled person will understand, a halo artifact typically corresponds with pixels surrounding a light or bright part of an image that are brighter or lighter than intended. Halo artifacts may occur for display devices with a plurality of light sources, for example where the area illuminated by one light source is larger than a bright region of the image. In some examples, such as that of FIG. 6, the method may therefore include determining that the image as displayed on the display device includes a halo artifact and adjusting the display luminance of the display device and applying the spatially-variant tone mapping operation to the image data in further dependence on the determining that the image as displayed on the display device includes the halo artifact. The determination of whether the image may include a halo artifact may involve an assessment of the extent of the pixel area illuminated by a particular light source or light sources and the intended pixel intensity for those pixels. If it is determined that the magnitude of the intensity difference between a first region of those pixels and a second region of those pixels is, for example, above a particular pre-determined threshold, the image may be considered susceptible to halo artifacts.

In the example of FIG. 6, the intensity of the second light source corresponding to the second zone 147*b* has been reduced in the second sub-graph 140*b* due to application of the method according to examples. The dark regions 144*b*, 145*b* in the second zone 147*b* have also been tone mapped to compensate for the reduction in the intensity of the second light source, to increase the contrast (as described further with reference to FIG. 5). Thus, the amplitude modulation of the dark regions 144*b*, 145*b* is the same in the first and second sub-graphs 140*a*, 140*b*, but the detail in the dark regions 144*b*, 145*b* will in general be more visible to a typical observer, improving the display quality of the image in the second sub-graph 140*b*. Moreover, by reducing the intensity of the second light source, the halo artifacts may be reduced, which may further improve the image quality. For example, with the image displayed in accordance with the second sub-graph 140*b*, the viewer may not be able to perceive a ring or "halo" of lighter pixels surrounding the central light region 143*b*. Instead, the dark regions 144*b*, 145*b* surrounding the central light region 143*b* may appear darker, but with detail nevertheless visible due to the application of the tone mapping operation.

In this example, the intensity of the first and third light sources in the first and third zones 146*b*, 148*b* has not been adjusted. This may be the case where, for example, the display quality of the parts of the image in the first and third zones 146*b*, 148*b* is already considered sufficiently high or if these parts of the image are relatively free of detail. No tone mapping has been applied to the portions of the image corresponding to the first and third zones 146*b*, 148*b* in this example as the display luminance of the first and third light sources is unchanged. Thus, in examples such as FIG. 6, applying the spatially-variant tone mapping operation may include applying a tone mapping operation to a portion of image data representing a part of the image. The part of the image may correspond with a light source of a plurality of light sources, such as a light source which has had its display luminance adjusted due to application of the method according to examples. In such cases, other parts of the image may not be tone mapped, for example if the light source or light sources corresponding to these parts is not adjusted during the application of the method, or tone mapping of a different amount or strength may be applied to the other parts of the image. For example, there may be a plurality of different display luminance adjustment zones, which each correspond with a different amount or magnitude by which the display luminance is adjusted. Each display luminance adjustment zone may correspond with a different respective tone mapping zone, in which a different amount or strength of tone mapping is applied to compensate for the adjustment in the display luminance in that zone. Each zone may include or correspond with a plurality of pixels of the display device used for displaying the image, for example a one or two dimensional patch, strip, stripe, one or more columns or one or more rows of pixels. In this way, both the display luminance and the tone mapping can be adjusted locally, as well as globally if needed.

The above examples are to be understood as illustrative examples. Further examples are envisaged. For example, in FIG. 3, the content analyzer is arranged to determine the intensity of pixels of the image to assess whether the image includes dark patches. However, in other examples, the content analyzer may analyses other features of the image. For example, the content analyzer may be arranged to analyses a level of detail or complexity in the image, as the visibility of compression artifacts may depend on the nature of the image itself.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method of controlling display of image data representing an image on a display device comprising a backlight, the method comprising:

determining one or more features of the image data, wherein the one or more features include a feature representative of a level of compression-noise in the image data; and in dependence on the determining:

adjusting a backlight intensity of the backlight to adjust, in dependence on the level of compression-noise in the image data, an intensity corresponding to a lightest greyscale level displayable by at least a portion of the display device; and applying a spatially-variant tone mapping operation to the image data, in dependence on the level of compression-noise in the image data.

2. The method according to claim 1, wherein the feature representative of the level of compression-noise in the image data relates to a format of the image data.

3. The method according to claim 2, wherein the format, to which the feature representative of a level of compression-noise in the image data relates, is a high dynamic range format.

4. The method according to claim 1, wherein:

the adjusting the backlight intensity comprises reducing the intensity corresponding to the lightest greyscale level displayable by at least the portion of the display device; and the applying the spatially-variant tone mapping operation to the image data comprises increasing contrast in a dark area of the image.

5. The method according to claim 1, wherein:

the one or more features include a feature that a characteristic representative of the level of compression-noise in the image data is higher than a characteristic representative of the level of compression-noise in image data of a previously displayed image;

the adjusting the backlight intensity comprises increasing the intensity corresponding to the lightest greyscale level displayable by at least the portion of the display device; and the applying the spatially-variant tone mapping operation to the image data comprises reducing contrast in a dark area of the image.

6. The method according to claim 1, wherein the adjusting the backlight intensity comprises substantially spatially uniformly adjusting the backlight intensity.

7. The method according to claim 1, wherein the adjusting the backlight intensity comprises adjusting the backlight intensity to adjust an intensity corresponding to a lightest greyscale level displayable by a first portion of the display device by a first amount, and to adjust an intensity corresponding to a lightest greyscale level displayable by a second portion of the display device, different from the first portion, by a second amount, different from the first amount.

8. The method according to claim 7, wherein the backlight comprises a plurality of light sources, each at a different location, and the adjusting the backlight intensity comprises adjusting a first intensity of a first light source of the plurality of light sources so that the first intensity is different from a second intensity of a second light source of the plurality of light sources.

9. The method according to claim 8, wherein the applying the spatially-variant tone mapping operation comprises applying a tone mapping operation to a portion of the image data representing a part of the image corresponding to the first light source.

10. The method according to claim 1, comprising determining that the image as displayed on the display device includes a halo artifact, the method comprising adjusting the backlight intensity and applying the spatially-variant tone mapping operation to the image data in further dependence on the determining that the image as displayed on the display device includes the halo artifact.

11. The method according to claim 1, comprising receiving ambient light data indicative of an ambient light level, the method comprising adjusting the backlight intensity and applying the spatially-variant tone mapping operation to the image data in further dependence on the ambient light level.

12. The method according to claim 1, wherein the one or more features include a feature resulting from an analysis of image content of the image.

13. The method according to claim 1, wherein the determining comprises processing the image data.

14. The method according to claim 1, comprising applying the spatially-variant tone mapping operation to the image data to alter a dynamic range of the image data.

15. A display controller for controlling display of image data representing an image on a display device comprising a backlight, the display controller comprising:

a luminance adjustment unit; and a tone mapping module, wherein the luminance adjustment unit is arranged to adjust a backlight intensity of the backlight to adjust an intensity corresponding to a lightest greyscale level displayable by at least a portion of the display device, in dependence on one or more features of the image data, wherein the one or more features include a feature representative of a level of compression-noise in the image data; and the tone mapping module is arranged to apply a spatially-variant tone mapping operation to the image data in dependence on the level of compression-noise in the image data.

16. The display controller according to claim 15, wherein the feature representative of the level of compression-noise in the image data relates to a format of the image data.

17. The display controller according to claim 15, wherein the luminance adjustment unit is arranged to adjust the backlight intensity to adjust an intensity corresponding to a lightest greyscale level displayable by a first portion of the display device by a first amount, and to adjust an intensity corresponding to a lightest greyscale level displayable by a second portion of the display device, different from the first portion, by a second amount, different from the first amount.

18. A display system comprising:

a display device comprising a backlight; and a display controller for controlling display of image data representing an image on the display device, the display controller comprising:

a luminance adjustment unit; and a tone mapping module, wherein the luminance adjustment unit is arranged to adjust a backlight intensity of the backlight to adjust an intensity corresponding to a lightest greyscale level displayable by at least a portion of the display device, in dependence on one or more features of the image data, wherein the one or more features include a feature representative of a level of compression-noise in the image data; and the tone mapping module is arranged to apply a spatially-variant tone mapping operation to the image data in dependence on the level of compression-noise in the image data.

19. The display system according to claim 18, wherein the feature representative of the level of compression-noise in the image data relates to a format of the image data.

20. The display system according to claim 18, wherein the luminance adjustment unit is arranged to adjust the backlight intensity to adjust an intensity corresponding to a lightest greyscale level displayable by a first portion of the display device by a first amount, and to adjust an intensity corresponding to a lightest greyscale level displayable by a second portion of the display device, different from the first portion, by a second amount, different from the first amount.

* * * * *